(12) United States Patent
Perrie et al.

(10) Patent No.: US 9,201,423 B2
(45) Date of Patent: Dec. 1, 2015

(54) METHOD AND DEVICE FOR AIDING THE MANAGING OF AIR OPERATIONS WITH REQUIRED NAVIGATION AND GUIDANCE PERFORMANCE

(75) Inventors: Jean-Damien Perrie, Toulouse (FR); Patrice Rouquette, Pompertuzat (FR); Nicolas Potagnik, Toulouse (FR); Sylvain Raynaud, Cornebarrieu (FR); Florent Lanterna, Toulouse (FR); Martin Legay, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 367 days.

(21) Appl. No.: 13/271,713

(22) Filed: Oct. 12, 2011

(65) Prior Publication Data
US 2012/0092193 A1    Apr. 19, 2012

(30) Foreign Application Priority Data
Oct. 18, 2010  (FR) ..................... 10 58466

(51) Int. Cl.
- G05D 1/10   (2006.01)
- G08G 5/04   (2006.01)
- G05D 1/00   (2006.01)

(52) U.S. Cl.
CPC ................... G05D 1/0077 (2013.01)

(58) Field of Classification Search
None
See application file for complete search history.

(56) References Cited

U.S. PATENT DOCUMENTS

| | | | | |
|---|---|---|---|---|
| 5,945,943 A | * | 8/1999 | Kalafus et al. | 342/357.31 |
| 2003/0222887 A1 | * | 12/2003 | Wilkins et al. | 345/618 |
| 2004/0189492 A1 | * | 9/2004 | Selk et al. | 340/973 |
| 2006/0167619 A1 | * | 7/2006 | Arethens | 701/120 |
| 2007/0299568 A1 | * | 12/2007 | Rouquette et al. | 701/3 |
| 2008/0294306 A1 | * | 11/2008 | Huynh et al. | 701/3 |
| 2010/0117447 A1 | * | 5/2010 | Cahill | 303/126 |
| 2010/0164754 A1 | * | 7/2010 | Chesne et al. | 340/974 |
| 2010/0204855 A1 | * | 8/2010 | Vial | 701/14 |

FOREIGN PATENT DOCUMENTS

EP    1014237    6/2000

OTHER PUBLICATIONS

French Patent Office, International Search Report FR 1058466 (2 pgs.), May 27, 2011.

* cited by examiner

Primary Examiner — Brian Zimmerman
Assistant Examiner — Kevin Lau
(74) Attorney, Agent, or Firm — Wood, Herron & Evans, LLP

(57) ABSTRACT

The device aids the management of air operations, such as operations under Required Navigation Performance with Authorization Required maneuvers. The device includes a guidance system including a plurality of stages for calculating parameters, each of the stages including an architecture having at least three pieces of equipment, which calculate the parameters and implement monitorings to determine the status of the equipment. The device uses these monitored statuses to determine a global status that indicates if the aircraft is able to carry out the air operations with required performance.

19 Claims, 1 Drawing Sheet

METHOD AND DEVICE FOR AIDING THE MANAGING OF AIR OPERATIONS WITH REQUIRED NAVIGATION AND GUIDANCE PERFORMANCE

TECHNICAL FIELD

The present invention relates to an aiding method and device for managing air operations with required navigation and guidance performance, carried out by an aircraft, in particular a transport airplane.

Although not exclusively, the present invention more particularly applies to Required Navigation Performance with Authorization Required ("RNP AR") type operations. Such RNP AR operations are based on a aRea NAVigation ("RNAV") type surface navigation and on Required Navigation Performance ("RNP") type operations. They have the particularity of requiring a special authorization so as to be able to be carried out on an aircraft.

BACKGROUND

The RNAV type surface navigation allows an aircraft to fly from one waypoint to another waypoint, rather than from ground stations (of radio-navigation means of the NAVAID type) to ground stations.

As known, the RNP concept corresponds to a surface navigation for which monitoring and warning means (on board the aircraft) are added, allowing to ensure that the aircraft remains in a corridor, referred to as RNP, around a reference path and authorizing curved paths to be taken into consideration. Outside this corridor there are potentially reliefs other aircrafts. The performance required for a RNP operation type is defined by a RNP value representing half the width (in nautical miles: NM) of the corridor around the reference path, wherein the aircraft should remain for 95% of the time during the operation. A second corridor (around the reference path) having half a width being twice the RNP value is also defined. The probability that the aircraft goes out of this second corridor should be lower than $10^{-7}$ per hour of flight.

The RNP AR operation concept is even more requiring. The RNP AR procedures are indeed characterized by:
RNP values:
  being lower than or equal to 0.3 NM in approach, and being able to go down to 0.1 NM; and
  being strictly lower than 1 NM at the start and upon throttling up, and being also able to go down to 0.1 NM;
a final approach segment that could be curved; and
obstacles (mountains, traffic . . . ) that could be located at twice the RNP value with respect to the reference path, while for the usual RNP operations, an additional margin with respect to obstacles is provided.

The air authorities have defined a TLS (<<Target Level of Safety>>) of $10^{-7}$ per operation, whatever the type. In the case of the RNP AR operations, as the RNP values are able to go down to 0.1 NM and the obstacles could be located at twice the RNP value of the reference path, such an objective results in a probability that the aircraft goes out of the corridor with half a width D=2·RNP that should not exceed $10^{-7}$ per procedure.

The equipment on board aircrafts (flight management system, inertial unit, means for updating GPS data and means for guiding the autopilot), as well as the usual architecture, does not allow to reach the target level of safety, if mitigation operational means are not provided including for the detection and the management of possible breakdowns. This is why a special authorization is required for such a type of operation, so as to ensure that the operational procedures and the training of pilots allow to reach the target level of safety. Furthermore, as the crew should take charge in some breakdowns, today's aircrafts are not able to ensure a RNP value of 0.1 NM upon a breakdown, as the crew is not able to meet the performance requirements in manual piloting.

On current aircrafts, the monitoring of RNP AR operations is implemented by means of two usual functions, that is:
a first function monitoring the accuracy and the integrity of the position calculation:
  the accuracy of the position is compared to once the RNP value;
  the integrity is compared to twice the RNP value; and
  if one of the two parameters, either accuracy or integrity exceeds the allotted threshold, a warning is emitted and the crew should take appropriate actions; and
a second function allowing the crew to monitor the guidance of the aircraft:
  the lateral and vertical deviations of the aircraft with respect to the reference path are displayed and shown to the crew;
  the crew monitors the deviations with respect to the budgets allotted for each deviation. Should the crew detect an excessive deviation, it should re-manage the aircraft again and take adequate corrective actions.

As previously indicated, current aircrafts are not able to guarantee a RNP value of 0.1 NM upon a breakdown and the crew should be specially trained for following the RNP AR procedures. Indeed, the crew should be able to detect and adequately process breakdowns being able to compromise the on-going operation.

The objective for future aircrafts is to be able to follow the RNP AR procedures with RNP values up to 0.1 NM, and this without restriction (in normal situation and in case of a breakdown) on a start, approach and throttling up. To this end, the crew should no longer be considered as the main means for detecting and processing breakdowns.

SUMMARY OF THE INVENTION

The present invention relates to a method for (automatically) aiding the managing of air operations with required navigation and guidance performance, carried out by an aircraft, in particular a transport airplane, allowing the above mentioned drawbacks to be overcome.

To this end, according to the invention, said method for aiding the managing of air operations with required navigation and guidance performance, carried out by an aircraft, being provided with a guidance system comprising at least the following successive stages:
  a calculation stage for the position of the aircraft;
  a managing stage for the flight plan of the aircraft;
  a calculation stage for the path of the aircraft;
  a calculation stage for (side and vertical) deviations; and
  a calculation stage for guidance orders of the aircraft;
is remarkable in that:
  there are provided on said guidance system, for each one of said stages:
    an architecture comprising at least N pieces of equipment, each of which is able to carry out the same functions relating to said stage, N being an integer higher than or equal to 3; and
    means allowing to implement monitorings;

at the level of each one of said stages, such a stage and the previous stage, if applicable, are monitored and a monitoring status is generated relating to these two stages; and a global status is determined, based on at least the set of thus generated monitoring statuses, that indicates if the aircraft is able to carry out said air operations with required performance.

Moreover, advantageously, said global status is shown to the crew of the aircraft, at least in the case of an impairment of said global status, as explained below.

Thus, thanks to this invention, a global status is automatically determined allowing for indicating to the crew the ability of the aircraft to carry out air operations with required performance, preferably RNP AR type operations, such as mentioned hereinabove.

According to the invention, the detection and the processing of breakdowns are automated, while allowing the crew to be kept informed about the current situation and the impact thereof on the ongoing operation. Thus, the crew are no longer the main means for detecting and processing breakdowns, but merely maintain a safeguarding role. Consequently, while implementing the method according to this invention on an aircraft, the latter is able to implement RNP AR procedures with RNP values up to 0.1 NM, and this without restriction (in normal situation and in case of a breakdown) upon a start, an approach or a throttling up. Moreover, the present invention allows to reduce mitigation means and thus the operational procedures as well as the pilots' training.

In a preferred embodiment, at least some of the following monitorings are implemented allowing, more particularly, determining said global status:
- a monitoring of the state of availability of systems in the aircraft and of the configuration of the architecture;
- a monitoring of the calculation accuracy and integrity of the position of the aircraft;
- a monitoring of the guidance performance of the aircraft; and
- a monitoring of the configuration of the aircraft.

Moreover, in a particular embodiment:
- said stage of calculation of the position of the aircraft is implemented in inertial and anemobarometric reference systems of the Air Data and Inertial Reference System ("ADIRS") type;
- said stages of managing of the flight plane, calculation of the path and calculation of the deviations are implemented in flight management systems of the Flight Management Systems ("FMS") type; and
- said stage of calculation of guidance orders is implemented in flight control and guidance systems of the Flight Control and Guidance System ("FCGS") type.

In a preferred, but not exclusive, embodiment, the monitoring statuses are, each time, transmitted to a system arranged directly downstream (in the chain of guidance), that is in the above mentioned particular embodiment: from ADIRS systems to FMS systems and from FMS systems to FCGS systems.

Moreover, advantageously, means are provided being able to emit at least some of the following warnings:
- a warning linked to the global status and to its impairment;
- a warning linked to the impairment of the calculation accuracy and integrity of the position of the aircraft; and
- a warning for excessive deviations of the aircraft with respect to its path.

Furthermore, advantageously, the present invention is automatically activated, as explained hereinbelow.

Furthermore, advantageously, at the level of some of said stages, and including at the level of said stage of calculation of the position of the aircraft:
- the values of a particular parameter are compared therebetween, respectively supplied by the different pieces of equipment of the stage, and a defect is detected in the case of an inconsistency between said values; and
- should a defect be detected, the defective equipment is determined and said stage is reconfigured (so as to no longer use the values supplied by this defective equipment in the remainder of the operation).

The present invention further relates to an (automatic) device for aiding the managing of air operations with required navigation and guidance performance, and including RNP AR operations, carried out by an aircraft, in particular a transport airplane.

According to the invention, said device of the type comprising a guidance system comprising at least the following successive stages:
- a calculation stage for the position of the aircraft;
- a managing stage for the flight plan of the aircraft;
- a calculation stage for the path of the aircraft;
- a calculation stage for deviations; and
- a calculation stage for guidance orders of the aircraft;

is remarkable in that:
said guidance system having an architecture comprising, for each one of said stages, at least N pieces of equipment, each of which is able to carry out the same functions relating to said stage, N being an integer higher than or equal to 3; and said guidance system further comprises;
at the level of at least some of said stages, means allowing to detect and to isolate breakdowns;
means for monitoring each stage and, if applicable, the previous stage and for generating a monitoring status relating to these two stages; and
means for determining, using at least the set of monitoring statuses, a global status that indicates if the aircraft is able to carry out said air operations with required performance.

The architecture according to this invention for detecting and isolating defective systems is based on a triplex architecture principle (or with N pieces of equipment (N≥3)) and thus provides using three sources, or more, throughout the chain of guidance of the aircraft: the calculation of the position of the aircraft, the managing of the flight plane, the calculation of the path, the calculation of the deviations (the position of the aircraft with respect to the path), and the calculation of the orders of slaving guidance on such a path. Each stage of the chain thus consists in N pieces of equipment (N≥3), allowing breakdowns to be detected and isolated. Moreover, each stage could be made up of identical pieces of equipment (symmetric stage) or of different ones (dissymmetric stage).

The present invention further relates to an aircraft, in particular a transport airplane, being provided with a device such as described hereinabove.

BRIEF DESCRIPTION OF THE DRAWINGS

The FIGS. of the appended drawings will better explain how this invention can be implemented. In these FIGS., like reference numerals relate to like components.

DETAILED DESCRIPTION

Figure 1:
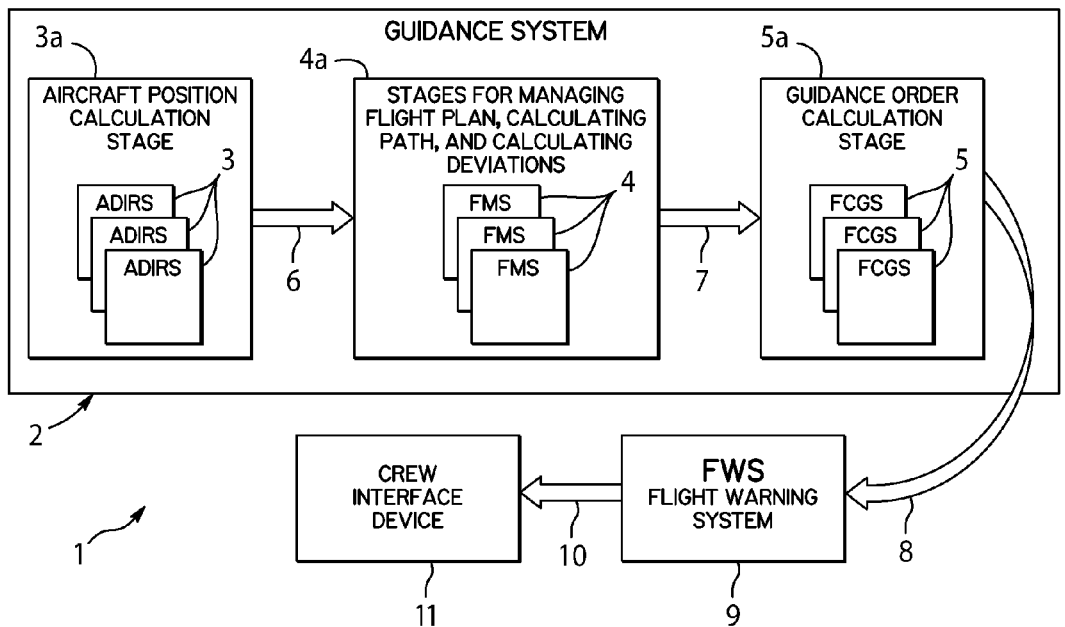
FIG. 1 is a block diagram of a first embodiment of a device according to this invention.
Figure 2:
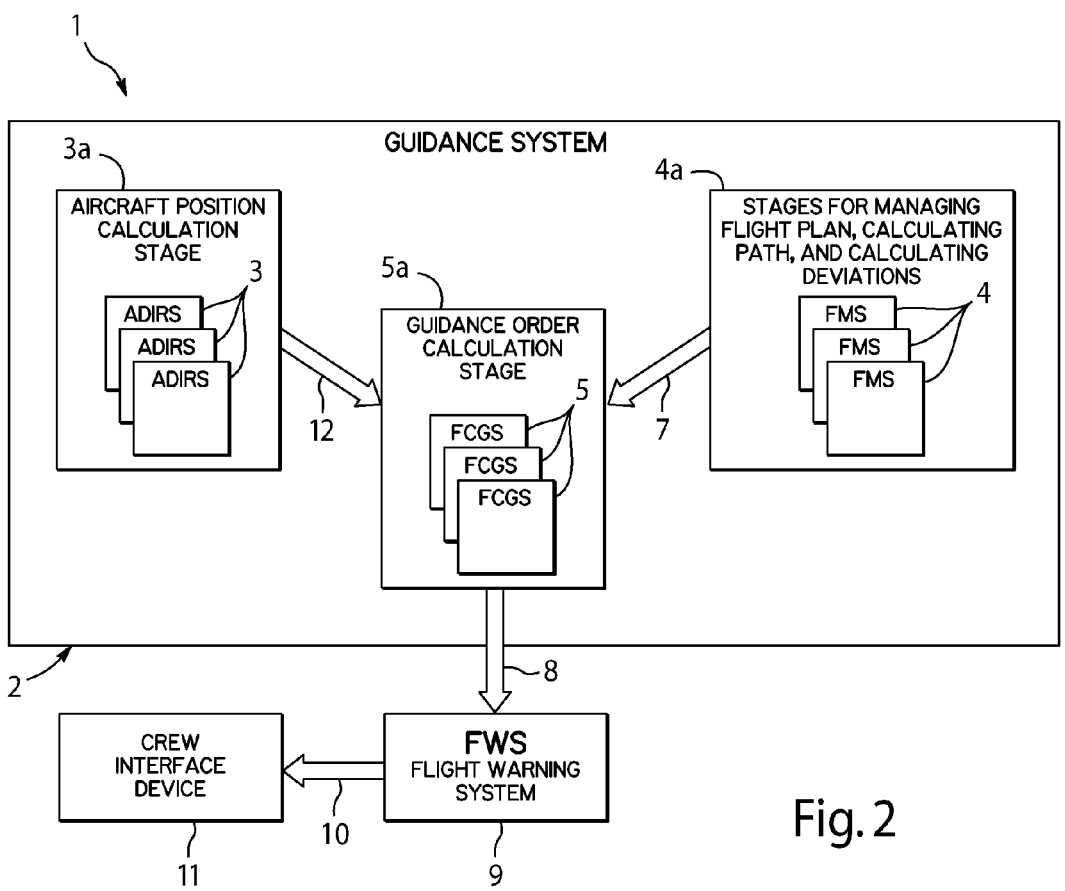
FIG. 2 is a block diagram of a second embodiment of a device according to this invention.

The device 1 according to this invention and schematically shown on FIGS. 1 and 2 is embedded on board an aircraft, in particular a transport airplane, not shown, and is intended for automatically aiding the managing of air operations with required navigation and guidance performance, and including RNP AR operations.

The device 1 has a guidance system 2 comprising at least the following successive stages:
- a calculation stage for the position of the aircraft;
- a managing stage for the flight plan of the aircraft;
- a calculation stage for the path of the aircraft;
- a calculation stage for the deviations; and
- a calculation stage for the guidance orders of the aircraft.

In a preferred embodiment, shown on FIGS. 1 and 2:
- the stage 3a of calculation for the position of the aircraft is implemented in inertial and anemobarometric reference systems 3 of the ADIRS type; Usually, such systems 3 of the ADIRS type calculate the position of the aircraft from data obtained from signal receiving systems (for instance Multi-Mode Receiver ("MMR") multimode receivers, including Global Navigation Satellite System ("GNSS") signals;
- the stages 4a of managing the flight plan, calculating the path and calculating the deviations are implemented in flight management systems 4 of the FMS type. Usually, such systems 4 manage the flight plan from data obtained from a navigation data base (not shown) and from data input by the pilot, build the reference path, and calculate the deviations between the position of the aircraft (received from the systems 3) and this reference path; and
- the stage 5a of calculation of guidance orders is implemented in flight control and guidance systems 5 of the FCGS type. Usually, such systems 5 ensure the guidance of the aircraft.

According to the invention:
said guidance system 2 has an architecture comprising, for each one of said stages, at least N pieces of equipment, each of which is able to carry out the same functions relating to said stage, N being an integer higher than or equal to 3. In the examples of FIGS. 1 and 2, the architecture of the system 1 is of the triplex type, with three systems 3 of the ADIRS type, three systems 4 of the FMS type, and three systems 5 of the FCGS type; and said guidance system 2 further comprises integrated means (not shown specifically because these means are incorporated into the stages 3a, 4a, 5b of the guidance system 2), including:
- means allowing to detect and to isolate breakdowns at the level of at least the stage of calculation of the position, but preferably at the level of each stage, for example, the ADIRS 3, FMS 4, and FCGS 5 self-monitor and reconfigure, as described in further detail below;
- means for monitoring each stage and, if applicable, the previous stage and for generating a monitoring status relating to these two stages, for example, the ADIRS 3, FMS 4, and FCGS 5 self-monitor to provide a monitoring status, as described in further detail below; and
- means for determining, using at least the set of monitoring statuses, as detailed hereinunder a global status that indicates if the aircraft is able to carry out said air operations with required performance, for example, the FCGS 5 uses monitoring statuses to determine a global status.

The architecture of the device 1, according to this invention, is therefore an architecture with N pieces of equipment (N≥3) per stage, throughout the chain of guidance. The use of N sources (N≥3) at the level of each stage of the chain allows to detect potential differences between contributors, and to identify, if applicable, a defective contributor. The device 1 on its whole is then able to reconfigure itself so as to isolate, for the whole duration of an operation, the subject contributor in a period of time sufficiently short so that the crew do not have to be involved in the managing of the breakdown.

Even if the reconfigurations do not require pilot action, such reconfigurations are nevertheless notified to the crew via monitoring functions being detailed herein below.

Four types of monitoring are provided:
- a monitoring of the state of availability of systems of the aircraft and the configuration of the architecture;
- a monitoring of the accuracy and the calculation integrity of the position of the aircraft, by means of a specific function warning the crew when the performance is no longer in accordance with the requirements of the operation, such a function being referred to as NAV PRIMARY;
- a monitoring of the guidance performance of the aircraft, by means of a function warning the crew in case of excessive deviations of the position of the aircraft with respect to the path; and
- a monitoring of the configuration of the aircraft, for checking that the configuration of the aircraft is consistent with the procedure to be followed: the speed of the aircraft, the activation of the autopilot, the activation of modes of guidance, etc.

Said global status (or RNP AR status) takes into consideration the results of the four above mentioned monitoring functions and illustrates a state of the RNP AR function allowing the crew to have a global overview of the ability of the aircraft to follow the RNP AR procedures.

The above mentioned monitoring functions could result for the crew as three different warnings, being emitted at the level of the cockpit of aircraft:
- a warning linked to the RNP AR global status and to its impairment;
- a warning linked to the impairment of the calculation accuracy and integrity for the position of the aircraft; and
- a warning for excessive deviations of the aircraft with respect to its path.

The aim of the present invention is to aid the managing of air operations with required performance, more particularly, as previously mentioned, of operations of the RNP AR type. However, the present invention could also be implemented for any parts of a flight requiring a high level of integrity, of robustness to breakdowns and of monitoring for following a flight plan. As an example, it could be implemented for operations in a mountainous environment, for which RNP procedures have not been created.

In a preferred embodiment, the architecture and the monitoring functions are activated automatically, without any action from the pilot. More precisely:
- the architecture and the monitoring function for excessive deviations are activated when the aircraft reaches the RNP AR procedure to be flown and is in the adequate configuration; and
- the other monitoring functions (NAV PRIMARY and RNP AR status) are activated throughout the flight, so as to allow the crew to know, at any time during the flight, the ability of the aircraft to follow the RNP procedures, and to anticipate a possible inability to follow the desired procedure. They are also active before the flight.

Within the scope of the present invention, the activation and the deactivation of the architecture and of the monitoring functions could however be implemented in various ways.

Thus, the triplex architecture could be activated automatically when a RNP value, being sufficiently low for requiring an increased integrity of the guidance of the aircraft, is associated to the path to be flown. In a particular embodiment, the RNP value should be lower than 0.3 NM, whether it is obtained from a navigation data base or from a manual capture of the crew. Beyond such a value, the crew is considered able to detect and to process any breakdown able to occur without compromising the holding of the RNP corridor.

Furthermore, the architecture being implemented only makes sense if the crew try to follow the path. Thus, this is activated only if an autopilot is activated and if the side guidance mode of follow-up of the flight plane (NAV) is activated.

Furthermore, the architecture being implemented only makes sense if the crew try to follow the path. Thus, this is activated only if an autopilot is activated and if the side guidance mode of follow-up of the flight plan (NAV) is activated.

The activation and deactivation could also be triggered by an action of the pilot, for instance the engagement of a second autopilot. In particular, the usual operations of follow-up of a flight plan, as they do not require any particular monitoring and trouble shooting operations, could be flown with one single activated autopilot, whereas the RNP AR operations, requiring a higher level of integrity, could be flown with the two activated autopilots, as is the case for some accuracy approaches of the Instrument Landing System ("ILS") type.

As previously indicated, the RNP AR global status is determined as a function of the availability of the systems in the chain of guidance, of the current configuration of the architecture and of the performance of calculation for the position and the guidance. Such a RNP AR global status indicates to the crew the system and operation ability of the aircraft to follow a RNP AR procedure.

The following section further details the way the RNP AR status is determined. Each system 3, 4, 5 thus implements, in addition to its contribution to the guidance, a monitoring function for the upstream system in the chain of guidance and communicates the result to the downstream system in the chain. Each system 3, 4, 5 also monitors its own operation and transmits its own status to the downstream system. Thus, in the example of FIG. 1:

the systems 3 of the ADIRS type:
   calculate and consolidate a position, from data received from the MMR receivers; and
   define a MMR/ADIRS common status;
the systems 4 of the FMS type:
   define the flight plan, calculate the reference path, and the deviations between the position of the aircraft and this reference path;
   receive the MMR/ADIRS status from the systems 3 (of the ADIRS type), via a link 6; and
   enrich this status with an ADIRS status defined by said systems 4 of the FMS type; and
   define a FMS status;

the systems 5 of the FCGS type:
   ensure the guidance of the aircraft;
   receive the MMR/ADIRS status from the systems 3 (of the ADIRS type), conveyed by the systems 4 (of the FMS type); via a link 7
   receive the MMR/ADIRS status enriched by the systems 4 (of the FMS type), via the link 7;
   receive the MMR/ADIRS status enriched by the systems 4 (of the FMS type), via a link 7;
   receive the FMS status from the systems 4 (of the FMS type), via the link 7;
   enrich this status with an FMS status defined by said systems 5 of the FCGS type;
   receive the status (detailed below) of the NAV PRIMARY function monitoring the accuracy and the integrity of the position of the aircraft;
   receive the status (detailed below) of the performance of guidance via the excessive deviations;
   receive the status (detailed below) of the configuration of the aircraft; and
   determine the RNP AR global status of the aircraft.

It should be noticed that the monitoring of the calculation performance for the position of the aircraft, according to this invention, is improved compared to the usual situation. While the accuracy of the position is compared, usually, to once the RNP value, the integrity of the position is compared, according to the invention, to twice the RNP value, $$\sqrt{(2*RNP)^2-FTE^2-PDE^2}$$

from which an auxiliary value is subtracted corresponding to the budget left to the guidance error and to the path definition error. The threshold used for the evaluation of the integrity of the position is then as follows:

$$\sqrt{(2*RNP)^2-FTE^2-PDE^2}$$

In this expression, Flight Technical Error ("FTE") corresponds to the budget allotted to the guidance error, and Path Definition Error ("PDE") corresponds to the budget allotted to the path definition error. In the previous expression, FTE and PDE could be replaced by a constant K taking into account the guidance errors, the path definition errors, and the pilot's reaction time.

If one of the two parameters, either accuracy or integrity, exceeds the allotted threshold, a warning is emitted to the crew. This new threshold of integrity allows the crew to be warned early enough so as to ensure the holding of the corridor having half a width being twice the RNP value.

Furthermore, it is usually known that the accuracy of guidance of the aircraft is monitored by the crew, thanks to the display, on the primary flight screen (of the Primary Flight Display ("PFD")), of side and vertical deviations with respect to the reference path. Thanks to the invention, the monitoring of side and vertical deviations is simplified by the use of a function warning the crew in the case of an excessive (side or vertical) deviation in the position of the aircraft with respect to the reference path. This function is implemented by the systems 5 of the FCGS type from deviations received from the systems 4 of the FMS type.

In a particular embodiment:
   the warning threshold for the side deviations is defined by min [RNP; 0.2 NM]. Indeed, the guidance inaccuracy should not exceed once the RNP value. Additionally, it is considered that a side deviation higher than 0.2 NM should be notified to the crew, whatever the RNP value; and the warning threshold for vertical deviations is set to 75 feet corresponding to the budget allotted by the air regulation for the vertical guidance error.

Furthermore, a last monitoring function, also implemented by the systems 5 of the FCGS type, checks that the aircraft is in the good configuration for following the RNP procedure. When the procedure is defined with low RNP values, lower than 0.3 NM for instance, and thus, the device 1 is or should be activated, the following parameters are met:
- one of the two autopilots or both autopilots should be activated;
- the mode of guidance in follow-up of the flight plan should be activated; and
- the speed of the aircraft should be consistent with the geometry of the path and the speed constraints defined in the procedure.

If one of the previous monitored parameters is not in the good configuration, a specific message is displayed so as to guide the crew in the action to carry out so as to put the aircraft back in a configuration consistent with the on-going operation.

Consequently, the systems 5 of the FCGS type concentrate the information of availability of all elements in the chain of guidance. They also concentrate the information of guidance performance and the calculation of the position, as well as the status of the configuration of the aircraft, then calculate a global status of the RNP AR function which is transmitted via a link 8, to a warning management system 9 of the Flight Warning System ("FWS") type. The system 9 then generates the warnings associated with the RNP status and transmits them, via a link 10, to a crew interface device 11 which show them to the crew.

In a preferred embodiment, the RNP AR global status could have three different states, respectively referred to as FULL RNP CAPABLE, RNP REDUNDANCY LOST and RNP CAPABILITY LOST. More precisely:
- when all the systems are available and their performance is adequate, the aircraft is declared able to ensure a RNP value of 0.1 NM without restriction. The RNP AR status is then in a first state referred to as FULL RNP CAPABLE or full RNP capacity. This first state corresponds to the default state of the RNP AR status and it is not notified to the crew. Only impairments of the RNP AR status are notified to the crew;
- if as a result of a breakdown and/or an automatic reconfiguration, a loss of redundancy occurs at a level of the chain of guidance, this loss of redundancy is notified to the crew by a second state of the global status, referred to as RNP REDUNDANCY LOST or RNP loss of redundancy; and
- should one or more breakdowns generate a functional loss or an impairment of the performance, such that the system 1 no longer ensures the integrity of the position and/or of the guidance, the global status takes a third state, referred to as RNP CAPABILITY LOST or loss of RNP capacity and the crew should react accordingly getting out of the on-going procedure. The procedure to be applied by the crew, depending on the event resulting in the impairment of the RNP AR status, is then displayed on a warning screen of the Warning Display ("WD") type, being part of the crew interface device 11.

Within the scope of the present invention, the RNP AR global status could be notified to the crew in various ways. In the previous solution, only the impairments of the RNP AR status are notified to the crew in the form of warnings. Another solution involves displaying a positive piece of information on the view screen for flight primary parameters, of the PFD type, while permanently supplying the RNP AR status to the crew, that is, for instance, an indication of the RNP DUAL type when the aircraft is able to guarantee the RNP procedure, an indication of the RNP SINGLE type, in the case of a loss of redundancy, and an indication of the RNP LOST type when the aircraft is no longer able to guarantee the RNP procedure.

In another embodiment shown on FIG. 2, the RNP AR global status is calculated in a somewhat different way. The systems 5 of the FCGS type always concentrate the information and calculate the RNP AR global status, but to this end, they receive directly the information from the systems 3 of the ADIRS/MMR type via a link 12, without the latter having transited through the systems 4 of the FMS types, said systems 4 nevertheless defining an ADIRS status.

The above described architecture and different functions of monitoring thereby allow the aircraft to meet the safety requirements inherent to the RNP AR operations while being able to automatically detect, identify and isolate a defective system. The crew can, in addition, follow up and monitor the good holding of the operation, thanks to the different functions of monitoring and to the RNP AR global status supplying them with a global overview of the capacity of the aircraft to follow the RNP AR procedures.

It should be noticed that alternatively:
- the triplex architecture described in the above mentioned particular embodiments, could be replaced with a higher number of redundancies for each of the contributors of the function;
- the guidance could be implemented in a single set containing, for instance, both the equivalent of the flight management system, the autopilot and the flight controls; and
- each contributor could also have an internal architecture, the redundancies of which are not based on the same systems.

The invention claimed is:

1. An aiding method for managing air operations with required performance based on a threshold required navigation performance value, carried out by an aircraft, which is provided with a guidance system comprising at least the following successive stages:
   - a calculation stage for the position of the aircraft;
   - a managing stage for the flight plan of the aircraft;
   - a calculation stage for the path of the aircraft;
   - a calculation stage for deviations; and
   - a calculation stage for guidance orders of the aircraft, the method comprising:
   providing for each one of the successive stages of the guidance system, an architecture comprising at least N pieces of equipment, each of which is able to carry out the same functions relating to the respective stage, N being an integer higher than or equal to 3; and the architecture further includes:
   - at least N inertial and anemobarometric reference systems implementing the calculation stage for the position of the aircraft;
   - at least N flight management systems implementing the managing stage for the flight plan, the calculation stage for the path of the aircraft, and the calculation stage for deviations; and
   - at least N flight control and guidance systems implementing the calculation stage for guidance orders of the aircraft;
   generating monitoring statuses for each one of the successive stages, by self-monitoring an operational status of the at least N inertial and anemobarometric reference systems, self-monitoring an operational status of the at least N flight management systems, and self-monitoring an operational status of the at least N flight control and guidance systems, each of said self-monitoring further comprising:
  comparing values of a particular parameter respectively supplied by the different pieces of equipment of the stage;
  determining that a defect is detected in the case of an inconsistency between the compared values; and
  when the defect is detected, identifying which of the different pieces of equipment of the stage is a defective piece of equipment, and reconfiguring the stage to not use the defective piece of equipment;
determining a global status for the air operations, based on at least the monitoring statuses for each one of the successive stages, that indicates if the aircraft is able to perform the air operations with required performance by automatically identifying whether any equipment in the guidance system is defective or broken down and automatically identifying whether the defective or broken down equipment prevents the guidance system from enabling the aircraft to perform the air operations with required performance;
determining a required navigation performance value for the aircraft; and
activating automatically the generating of the monitoring statuses for each one of the successive stages and the determining of the global status when the required navigation performance value is less than the threshold required navigation performance value.

2. The method according to claim 1, further comprising generating at least one additional monitoring status with the guidance system, the at least one additional monitoring status selected from the following:
  a monitoring status of the state of availability of systems in the aircraft and of the configuration of the architecture;
  a monitoring status of the calculation accuracy and integrity of the position of the aircraft; and
  a monitoring status of the guidance performance of the aircraft,
  wherein determining the global status for the air operations is also based on the at least one additional monitoring status generated by the guidance system.

3. The method according to claim 1, wherein the threshold required navigation performance value and the required navigation performance value are a threshold required navigation performance with authorization required value and a required navigation performance with authorization required value, respectively.

4. The method according to claim 1, wherein each of the successive stages in the guidance system is connected to a corresponding downstream element which is either the next successive stage or a flight warning system that is connected downstream from the guidance system, and the method further comprises:
  transmitting the monitoring statuses generated for each of the successive stages to the corresponding downstream element for each of the successive stages.

5. The method according to claim 4, wherein the flight warning system emits at least one of the following warnings:
  a warning linked to the global status for the air operations and to an impairment of the global status;
  a warning linked to an impairment of accuracy and of calculation integrity in the position of the aircraft; and
  a warning for excessive deviations of the aircraft with respect to the path.

6. The method according to claim 4, further comprising:
  showing the global status to a crew of the aircraft with a crew interface device connected to the flight warning system, at least when the global status is impaired.

7. An aiding device for managing air operations with required performance based on a threshold required navigation performance value, carried out by an aircraft, the device comprising:
  a guidance system including at least the following successive stages:
    a calculation stage for the position of the aircraft;
    a managing stage for the flight plan of the aircraft;
    a calculation stage for the path of the aircraft;
    a calculation stage for deviations; and
    a calculation stage for guidance orders of the aircraft; and
  an architecture provided for each of the successive stages of the guidance system and comprising at least N pieces of equipment, each of which is able to carry out the same functions relating to the respective stage, N being an integer higher than or equal to 3; and the architecture further includes:
    at least N inertial and anemobarometric reference systems implementing the calculation stage for the position of the aircraft;
    at least N flight management systems implementing the managing stage for the flight plan, the calculation stage for the path of the aircraft, and the calculation stage for deviations; and
    at least N flight control and guidance systems implementing the calculation stage for guidance orders of the aircraft,
  wherein the at least N inertial and anemobarometric reference systems self-monitor an operational status, the at least N flight management systems self-monitor an operational status, and the at least N flight control and guidance systems self-monitor an operational status to collectively generate monitoring statuses for each one of the successive stages, wherein each of the at least N inertial and anemobarometric reference systems, at least N flight management systems, and at least N flight control and guidance systems performs the self-monitoring by at least:
    comparing values of a particular parameter respectively supplied by the different pieces of equipment of the stage;
    determining that a defect is detected in the case of an inconsistency between the compared values; and
    when the defect is detected, identifying which of the different pieces of equipment of the stage is a defective piece of equipment, and reconfiguring the stage to not use the defective piece of equipment, and
  wherein the guidance system determines, based on at least the monitoring statuses for each one of the successive stages, a global status that indicates if the aircraft is able to perform the air operations with required performance by automatically identifying whether any equipment in the guidance system is defective or broken down and automatically identifying whether the defective or broken down equipment prevents the guidance system from enabling the aircraft to perform the air operations with required performance, and
  wherein the guidance system is configured to determine a required navigation performance value for the aircraft and is configured to automatically activate generation of the monitoring statuses for each one of the successive stages and determination of the global status when the required navigation performance value is less than the threshold required navigation performance value.

8. The device according to claim 7, wherein the guidance system generates at least one additional monitoring status which is used to determine the global status, the at least one additional monitoring status selected from the following:
   a monitoring status of the state of availability of systems of the aircraft and of the configuration of the architecture;
   a monitoring status of the calculation accuracy and integrity of the position of the aircraft; and
   a monitoring status of the guidance performance of the aircraft.

9. The device according to claim 7, wherein the threshold required navigation performance value and the required navigation performance value are a threshold required navigation performance with authorization required value and a required navigation performance with authorization required value, respectively.

10. The device according to claim 7, further comprising:
    a flight warning system connected to the guidance system and that emits at least one of the following warnings:
      a warning linked to the global status for the air operations and to an impairment of the global status;
      a warning linked to an impairment of accuracy and of calculation integrity in the position of the aircraft; and
      a warning for excessive deviations of the aircraft with respect to the path.

11. The device according to claim 10, further comprising:
    a crew interface device connected to the flight warning system and that shows the global status to a crew of the aircraft at least when the global status is impaired.

12. The method according to claim 4, wherein transmitting the monitoring statuses for each one of the successive stages further comprises:
    transmitting the monitoring status of the calculation stage for the position of the aircraft generated by the at least N inertial and anemobarometric reference systems to the at least N flight management systems connected downstream from the at least N inertial and anemobarometric reference systems;
    transmitting the monitoring statuses of the managing stage for the flight plan, the calculation stage for the path of the aircraft, and the calculation stage for deviations generated by the at least N flight management systems to the at least N flight control and guidance systems connected downstream from the at least N flight management systems; and
    transmitting the monitoring status of the calculation stage for the guidance orders generated by the at least N flight control and guidance systems to the flight warning system.

13. The method according to claim 12, wherein generating a monitoring status for each one of the successive stages further comprises:
    monitoring the operational status of the at least N inertial and anemobarometric reference systems with the at least N flight management systems connected downstream; and
    monitoring the operational status of the at least N flight management systems with the at least N flight control and guidance systems connected downstream.

14. The method according to claim 4, wherein transmitting the monitoring statuses for each one of the successive stages further comprises:
    transmitting the monitoring status of the calculation stage for the position of the aircraft generated by the at least N inertial and anemobarometric reference systems to the at least N flight control and guidance systems connected downstream from the at least N inertial and anemobarometric reference systems;
    transmitting the monitoring status of the managing stage for the flight plan, the calculation stage for the path of the aircraft, and the calculation stage for deviations generated by the at least N flight management systems to the at least N flight control and guidance systems connected downstream from the at least N flight management systems; and
    transmitting the monitoring status of the calculation stage for the guidance orders generated by the at least N flight control and guidance systems to the flight warning system.

15. The method according to claim 14, wherein generating monitoring statuses for each one of the successive stages further comprises:
    monitoring the operational status of the at least N inertial and anemobarometric reference systems with the at least N flight control and guidance systems connected downstream; and
    monitoring the operational status of the at least N flight management systems with the at least N flight control and guidance systems connected downstream.

16. The method according to claim 1, further comprising:
    activating automatically the generating of the monitoring statuses for each one of the successive stages and the determining of the global status without action from a pilot of the aircraft.

17. The method according to claim 1, further comprising:
    operating the aircraft via an autopilot system; and
    activating automatically the generating of the monitoring statuses for each one of the successive stages and the determining of the global status without action from a pilot of the aircraft only after the aircraft is in operation via the autopilot system.

18. The device according to claim 7, wherein the guidance system is configured to activate automatically the generating of the monitoring statuses for each one of the successive stages and the determining of the global status without action from a pilot of the aircraft.

19. The device according to claim 7, wherein the guidance system is configured to operate the aircraft via an autopilot system and activate automatically the generating of the monitoring statuses for each one of the successive stages and the determining of the global status without action from a pilot of the aircraft only after the aircraft is in operation via the autopilot system.

* * * * *